US008265061B1

(12) United States Patent  
Smith et al.

(10) Patent No.: US 8,265,061 B1
(45) Date of Patent: Sep. 11, 2012

(54) OPTIMAL EXPANSION OF A TELECOMMUNICATIONS NETWORK

(75) Inventors: Donald E. Smith, Lexington, MA (US);
Rina R. Schneur, Lexington, MA (US);
Raghavendran Sivaraman, Cambridge, MA (US); Lawrence W. Crom, Millington, NJ (US); Roger L. Tobin, Arlington, MA (US); Hui Liu, Lexington, MA (US)

(73) Assignee: Verizon Services Corp., Ashburn, VA (US)

( * ) Notice: Subject to any disclaimer, the term of this patent is extended or adjusted under 35 U.S.C. 154(b) by 1983 days.

(21) Appl. No.: 11/261,602

(22) Filed: Oct. 31, 2005

(51) Int. Cl.
*H04L 12/66* (2006.01)
*H04L 12/28* (2006.01)
*G06Q 10/00* (2012.01)

(52) U.S. Cl. ....... 370/352; 370/254; 370/255; 705/7.12; 705/7.25; 705/7.31

(58) Field of Classification Search .......... 370/464–465, 370/254–258, 352–356; 705/7.12, 7.25, 705/7.31
See application file for complete search history.

(56) References Cited

U.S. PATENT DOCUMENTS

| | | | | |
|---|---|---|---|---|
| 5,903,559 A * | 5/1999 | Acharya et al. | ............... | 370/355 |
| 6,118,779 A * | 9/2000 | Madonna | ...................... | 370/353 |
| 6,640,239 B1 * | 10/2003 | Gidwani | ........................ | 709/203 |
| 6,654,354 B1 * | 11/2003 | Watkins et al. | ............... | 370/258 |
| 7,123,612 B2 * | 10/2006 | Lu | .................. | 370/388 |
| 7,126,914 B2 * | 10/2006 | Blackburn | .................... | 370/233 |
| 7,227,927 B1 * | 6/2007 | Benedyk et al. | ............. | 379/9.05 |
| 7,334,046 B1 * | 2/2008 | Betker | .......................... | 709/241 |
| 7,346,043 B1 * | 3/2008 | Olshansky et al. | ........... | 370/352 |
| 7,426,562 B1 * | 9/2008 | Johri | .............................. | 709/226 |
| 7,450,845 B2 * | 11/2008 | Beshai et al. | .................... | 398/47 |
| 7,486,661 B2 * | 2/2009 | Van Den Boeck et al. | ... | 370/352 |
| 7,492,882 B1 * | 2/2009 | Sripathi et al. | ........... | 379/201.01 |
| 7,583,795 B1 * | 9/2009 | Florence et al. | .............. | 379/133 |
| 2003/0198213 A1 * | 10/2003 | Jensen et al. | ................... | 370/351 |
| 2004/0039792 A1 * | 2/2004 | Nakanishi | ..................... | 709/217 |
| 2005/0068964 A1 * | 3/2005 | Wright et al. | ............ | 370/395.21 |
| 2005/0073998 A1 * | 4/2005 | Zhu et al. | ....................... | 370/352 |
| 2005/0226205 A1 * | 10/2005 | Kain et al. | ..................... | 370/349 |
| 2006/0146716 A1 * | 7/2006 | Lun et al. | ...................... | 370/238 |

OTHER PUBLICATIONS

Webb, A.; Turton, B.C.H.; Brown, J.M., "Application of genetic algorithm to a network optimisation problem", Mar. 29-Apr. 1, 1998, Telecommunications, 1998. 6th IEE Conference on (Conf. Publ. No. 451).*
Sinclair, M.C., "Minimum cost wavelength-path routing and wavelength allocation using a genetic-algorithm/heuristic hybrid approach", Feb. 1999, Communications, IEE Proceedings, vol. 146, Issue 1.*
B. Yaged, "Minimum Cost Routing for Dynamic Network Models," Networks 1, 193-224 (1973).
N. Christofides, et al., "Optimal Expansion of an Existing Network," Math. Prog. 6: 197-211 (1974).

(Continued)

*Primary Examiner* — Asad M Nawaz
*Assistant Examiner* — Joel Hamel (57) ABSTRACT

There is assigned at least one first cost for expanding at least one link to a circuit-switched network that is part of a hybrid network comprising the circuit switched network and a packet switched network. All paths in the packet switched network are represented with a virtual link. A cost is assigned to the virtual link. An integer programming problem is solved to determine a number of links to add to the network, the integer programming problem having as inputs a model of the hybrid network and a demand forecast matrix.

27 Claims, 4 Drawing Sheets

OTHER PUBLICATIONS

N. Zadeh, "On Building Minimum Cost Communication Networks over Time," Networks 4: 19-34 (1974).

P. J. Doulliez et al., "Optimal Network Capacity Planning: A Shortest Path Scheme," Opns. Res. 23: 811-818 (1975).

M. Minoux, "Network Synthesis and Dynamic Network Optimization," Anns. Discr. Math. 31: 283-324 (1987).

A. Balakrishnan et al., "A Dual-Ascent Procedure for Large Scale Uncapacitated Network Design," Opns. Res. 37: 716-740 (1989).

A. Dutta et al., "A Multiperiod Capacity Planning Model for Backbone Computer Communications Networks," Opns. Res. 40, 689-705 (1992).

S. G. Chang et al., "Telecommunications Network Topological Design and Capacity Expansion: Formulations and Algorithms," Telecommun. Syst. 1, 99-131 (1993).

H. Luss, "Operations Research and Capacity Expansion Problems: A Survey," Opns. Res. 30, 907-947 (1982).

* cited by examiner

FIG. 3. A five-year demand forecast.

Fig. 4. Comparison of the numbers of capacity units the routing optimization tool and LHSP add each year.

OPTIMAL EXPANSION OF A TELECOMMUNICATIONS NETWORK

BACKGROUND INFORMATION

In recent years, telecommunications providers have generally been migrating their networks away from use of circuit switches, which have been the mainstay telephone switching devices for decades. Circuit switches connect to one another with circuits called trunks; one call uses one trunk for its entire duration. The newer switching technology is called a softswitch. A softswitch sends a call as packets over a packet switched network, such as an Internet Protocol (IP) network, when communicating to another softswitch. A softswitch and a circuit switch communicate over a trunk group (a set of trunks).

Telecommunications providers are adopting IP network technologies primarily to lower costs. IP-based equipment itself is often cheaper than its circuit-switched counterpart. In addition, providers hope to gain economies of scale by carrying different traffic types (voice, data, video, etc.) on the same IP infrastructure instead of on separate networks. As part of the evolution from a circuit-switched backbone to a packet-switched backbone, providers generally use only softswitches as intermediate nodes between backbone switches. Circuit switches do not serve as intermediate transit points for other pairs of backbone switches.

Much of the migration from circuit switches to softswitches described above occurs as networks are expanded. As long distance and wireless traffic grow rapidly, so must the networks that carry this voice traffic. The problem of expanding telecommunications network facilities has received much attention over the last three decades. For example, work done in the 1970s generally addresses a dynamic, multiperiod, multifacility problem with discrete capacity addition sizes. This work is reflected in B. Yaged, "Minimum Cost Routing for Dynamic Network Models," *Networks* 1, 193-224 (1973); N. Christofides, et al., "Optimal Expansion of an Existing Network," *Math. Prog.* 6: 197-211 (1974); N. Zadeh, "On Building Minimum Cost Communication Networks over Time," *Networks* 4: 19-34 (1974); P. J. Doulliez et al., "Optimal Network Capacity Planning: A Shortest Path Scheme," *Opns. Res.* 23: 811-818 (1975), all of which are incorporated herein by reference in their entireties. Because of the complexity of the foregoing problem, as pointed out by M. Minoux, "Network Synthesis and Dynamic Network Optimization," *Anns. Discr. Math.* 31: 283-324 (1987), incorporated by reference herein in its entirety, work starting in the late 1980s has focused on a variety of approaches to develop computationally efficient solution methods. These include A. Balakrishnan et al., "A Dual-Ascent Procedure for Large Scale Uncapacitated Network Design," *Opns. Res.* 37: 716-740 (1989); A. Dutta et al., "A Multiperiod Capacity Planning Model for Backbone Computer Communications Networks," *Opns. Res.* 40, 689-705 (1992); and S. G. Chang et al., "Telecommunications Network Topological Design and Capacity Expansion: Formulations and Algorithms," *Telecommun. Syst.* 1, 99-131 (1993), all of which are incorporated herein by reference in their entireties.

H. Luss, "Operations Research and Capacity Expansion Problems: A Survey," *Opns. Res.* 30, 907-947 (1982), incorporated herein by reference in its entirety, presented a survey of capacity expansion problems, including the early network expansion work. Luss identifies the three major decisions in capacity expansion problems as expansion sizes, expansion times, and expansion locations. In addition, for network capacity expansion problems, the flow routing must be determined.

Thus, typically, capacity expansion problems are multi-period, and capacity additions exhibit economies of scale, i.e., the average cost of a unit of capacity decreases with larger additions. Therefore, there is a trade-off between the lower unit cost of capacity and putting capacity in place before it is needed. A common approach ignores any constraints on capital availability in order to minimize the discounted cost of expansion. This is the right approach if one has access to, and can determine the cost of, capital, but for practical business planning models, capital costs are not always easy to determine. Moreover, in present times telecommunications providers generally do not enjoy unlimited access to capital for network expansion purposes.

Accordingly, business constraints make it desirable to reduce the expansion problem described above to a simpler special case. Specifically, it would be desirable to be able to minimize the capital outlay in the current period required to provide service for the next year, similar to solving a multi-period problem assuming a very high cost of capital. There are two other reasons why planning only one period ahead would be desirable. First, forecasts of demand patterns in a network are quite uncertain, especially several periods out. Second, the technologies for providing the capacity additions are evolving rapidly and their costs are dropping.

Further, it would be desirable to perform network planning that takes into account the features of a hybrid network, i.e., a network that combines at least one circuit-switched network with at least one packet-switched network. Such network planning would be particularly advantageous in facilitating the migration that is occurring from circuit-switched networks to packet-switched networks.

DETAILED DESCRIPTION OF THE PREFERRED EMBODIMENTS

It is now common to transport voice telephone within the United States and elsewhere on a mixed, or hybrid, circuit-switched and packet-switched network. As long distance and wireless traffic are growing rapidly, so must the network. Moreover, it is now common for traffic that was traditionally carried on a circuit-switched network to be migrated to a packet-switched network. Disclosed herein is a routing optimization tool that minimizes the capital expended annually on network growth and migration. This tool uses the solution to an integer programming problem to optimally expand individual links, and uses a path decomposition heuristic to then provide routing on the expanded network. For example, use of one embodiment applied to a particular network is estimated to result in expansion costs of about five million dollars, as compared to nine million dollars using a predecessor tool that does not optimize. In that situation, over a five-year period, capital expenditures associated with the optimized expansion plan is estimated to cost approximately thirty percent (30%) less than those of the predecessor tool.

I. NETWORK OVERVIEW

Figure 1:
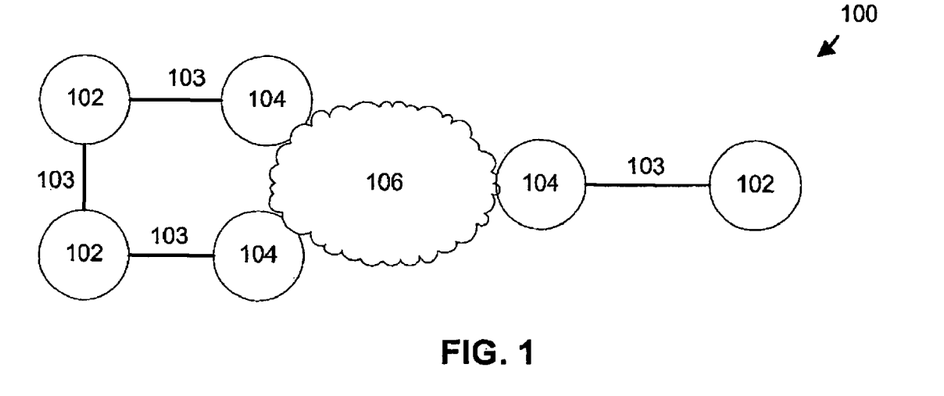
FIG. 1 presents a simplified view of a voice network, according to an embodiment.

FIG. 1 presents a simplified view of a voice network 100 including circuit switches 102, links 103, and softswitches 104. In general, network 100 may be a voice backbone and may include both circuit switches 102 and softswitches 104. Softswitches 104 are connected to a packet switched network, such as an Internet Protocol (IP) network 106. The links between softswitches 104 and the IP network 106, as well as links within the IP network 106, are transparent to the routing optimization tool disclosed herein, which sees the path from a first softswitch 104 to a second softswitch 104 as essentially a single link 103, but illustrated as being part of network cloud 106. That is, a path through network 106 may be thought of as a virtual link 103 in the hybrid network 100. Accordingly, when the optimization tool is considering the costs of adding a link 103 to the network 100 as described below, in treating all paths through IP network 106 as the same virtual link 103 in hybrid network 100, the optimization tool assumes that there is a single cost to adding paths to the network 106. Put another way, all links 103 that represent a path through IP network 106 are associated with the same cost. This view of paths between softswitches 104, including intervening IP network 106, allows the optimizing tool to advantageously and in a novel fashion facilitate the migration of traffic from a circuit-switched network to an IP network 106.

Those skilled in the art will be aware that a voice backbone, and the networks it serves, together constitute a hierarchical telecommunications network. The lowest tier of the hierarchical telecommunications network consists of end offices, the telephone switches to which conventional (i.e., wired) telephones connect. An end office will switch an entire call only if the call is between two customers whose lines terminate on the end office. If the two customers reside on different end offices, switches in the next tier of the hierarchy, called tandems, may become involved. For regulatory purposes, the United States is partitioned geographically into Local Access and Transport Areas (LATAs); a local exchange carrier (LEC) may carry calls within LATAs. If the two customers are in the same LATA, then the LEC can connect the call from one end office to the other either through a tandem or via a direct connection. Further, those skilled in the art will recognize that LATAs have a counterpart in wireless communications.

When the two customers are in different LATAs, the next tier of the hierarchy, a long distance carrier, must participate in the call. The caller's LEC hands the call to a long distance carrier's switch directly or through one of its tandems. The long distance carrier, in turn, delivers the call to the called party's LEC, which completes the call.

Further, those skilled in the art will recognize that the different LATAs are connected by a voice backbone, such as network 100. The goal of the optimizing tool described herein is to optimize the expansion of a network 100, e.g., an inter-LATA voice backbone. From the perspective of the voice backbone, an entire LATA is a source and sink of calls. Accordingly, a LATA and its counterpart in the wireless arena are herein referred to as traffic endpoints. Each traffic endpoint connects to at most one backbone switch 102 or 104.

For exemplary purposes in the present disclosure, embodiments are discussed herein with reference to a voice backbone network 100 that includes thirteen (13) circuit switches 102 and 15 softswitches 104 connected by one-hundred eighteen (118) trunk groups, which include links (i.e., trunks) 103. Further, the IP network 106 is represented as an additional node, so the network 100 used for exemplary purposes herein includes a total of twenty-nine (29) nodes. To expand this example, the network further includes one-hundred and forty-eight (148) one-way links 103, and seven-hundred and fifty-six (756) origin-destination demands for network capacity. The demand matrix is constructed from a traffic endpoint-to-traffic endpoint demand matrix such as is known to those skilled in the art. The present example assumes three-hundred and fifty-seven (357) traffic endpoints and, therefore, 127,092 endpoint-to-endpoint demands (because $357^2-357=127,092$). Further, because each endpoint is connected to only one backbone switch, the endpoint-to-endpoint demands can be aggregated to form a switch-to-switch demand matrix. To reduce the number of flow variables, flow "commodities" are defined herein by origin node only, rather than by origin/destination pair.

II. IDENTIFICATION OF LINKS FOR EXPANSION

A. Programming Variables

The following notation and data is used to model a hybrid network 100 and to describe the optimization problem solved by the routing optimization tool disclosed herein.

T denotes the set of all trunk groups.

A=T∪{IP Links} is the set of all links; that is, the set of all trunk groups plus the set of all softswitch to softswitch paths is the set of all links.

In the model, each link e is directed; we view it as going from a switch to another switch, even though traffic flows both ways on e.

head (e) denotes the "to" end of link e. Viewing a link as an arrow, the head end is the arrowhead.

tail (e) is the tail end of the arrow representing e.

S is the set of all switches (circuit and softswitch).

L is the set of all circuit switches.

$\delta^-(v)=\{e \in A: \text{head}(e)=v\}$ is the set of links that point into a switch v∈S.

$\delta^+(v)=\{e \in A: \text{tail}(e)=v\}$ is the set of links that point out of v.

The following data describes the existing network configuration and forecasted demands:

$n_e$ is the number of DS3 circuits (where a DS3 equates to 672 call channels), known to those skilled in the art, presently on the trunk group e∈T.

$k_e$ indicates whether the trunk group e is capped. That is, $k_e=1$ if the group is capped and $k_e=0$ if it is not.

$c_e$ is the cost of adding each new DS3 in the trunk group e.

$d_{uv}$, is the demand in DS0s (as known to those skilled in the art, a DS0 is the base for the digital signal X series, i.e., a series of standard digital transmission rates or levels, i.e., a DS0 equates to a single call channel) from u to v for distinct u, v∈S. The "diagonal term" has the special meaning $$d_{uu} = -\sum_{v \neq u} d_{uv}.$$

$l_g$ is the loading limit for a trunk group that grows.

$l_c$ is the loading limit for a trunk group that does not grow (either because it is capped or because enough capacity already exists).

The decision variables, used in the integer programming optimization problem described below are as follows:

$x_e$ is the number of DS3s added to trunk group $e \in T$.

$g_e$ indicates whether the trunk group $e \in T$ grows ($g_e$=1) or does not ($g_e$=0).

$f_{ue}^+$ denotes the flow on link $e \in A$ in e's forward direction that originates at $u \in S$.

$f_{ue}^-$ denotes the flow on link $e \in A$ in e's reverse direction that originates at $u \in S$.

The inputs to the optimizer tool disclosed herein are a model of the current hybrid network 100 using some or all of the variables described above and a matrix of forecast demands. The links of the network are the trunk groups and are specified in program databases as an ordered pair of switches 102 and/or 104, even though they carry traffic in both directions. To maintain consistency with the databases, each link of the network is treated as a directed arc and forward and reverse flows on the arc are maintained. A typical entry in the matrix of forecast demands specifies the volume of demand originating (entering the network) at one network switch and terminating (leaving the network) at another. The unit of demand is a link 103, i.e., a trunk. That is to say, if the demand between two switches were 2,000 trunks, then 2,000 direct trunks would be required between the two switches to carry busy hour traffic and satisfy all quality of service criteria.

Prior to formulating the integer programming problem that optimizes network growth, it is necessary to identify the parts of a network 100 that are candidates for growth. Accordingly, a binary indicator variable (denoted above as $g_e$) is used to indicate which trunk groups are allowed to grow, and an integer variable (denoted above as $x_e$) is used to indicate the number of DS3 circuits, known to those skilled in the art, to add to each trunk group that will grow. Those skilled in the art will recognize that, to ensure adequate network capacity, it may be desirable to regard different trunk groups as being "filled," i.e., unable to meet further demand, when a certain percentage of the capacity of the trunk group is used. For example, in one embodiment, the target utilization (or "fill level") of existing trunk groups on the network 100 is set at 80% of capacity, and the target utilization of trunk groups newly grown is set at 60% of capacity. Accordingly, if a particular trunk group is allowed to grow, the routing optimization tool may set the integer variable mentioned above to ensure that, based on forecasted demand, the appropriate target utilization is met for that trunk group. Further inputs include the cost of adding a DS3 on any given trunk group and an indication $k_e$ of whether or not each trunk group is capped. Those skilled in the art will understand that capping trunk groups drives the migration from circuit switches to packet switches by forcing traffic through softswitches. The optimizer tool may end up adding no trunks to a given trunk group either because the trunk group is capped or because the tool finds it more economical to transport traffic on a trunk group other than a given trunk group, even if the given trunk group is not capped. Those skilled in the art will understand that trunk groups have different loading limits according to whether or not they grow, and that loading limits are smaller for groups that grow, in order to provide extra capacity for future growth. If the group does not grow, one can allow its loading limit to be higher. The two loading limits—one for trunk groups for which $g_e$ is 0 (no growth), and one for trunk groups for which $g_e$ is 1 (growth)—are also inputs.

Except for $x_e$, which, as described above, is the number of DS3s that the optimizer tool adds to trunk group $e \in T$, the variables listed as "decision variables" above, though outputs from the integer programming problem below, remain internal to the tool. $x_e$ is, as explained below, one of the tool's key outputs. However, $g_e$, which indicates whether the trunk group $e \in T$ grows ($g_e$=1) or does not ($g_e$=0), is merely an auxiliary label that the tool computes to choose a loading limit appropriate for the trunk group. The optimizer converts demand into the link flows $f_{ue}^+$, and $f_{ue}^-$ for its own internal calculations; the flows are of no interest to the end user.

What is of interest to the end user is the identification of links to be added to a network 100, the afore-mentioned link flows being used to achieve this identification. That is, a user of the optimizer tool seeks to know where and how much capacity to add, namely $x_e$. The other output of interest is how to route traffic. That is, how should traffic from source A to destination B get from A to B? As explained below, the optimizer tool answers this question by finding a set of paths (i.e., a sequence of nodes 102 and/or 104) from A to B, and a percentage of A-B demand that follows each path.

B. Integer Programming Formulation

With the foregoing understanding of notation, data, and decision variables, it is possible to identify a set of link flows ($f_{ue}^+$, $f_{ue}^-$) for $e \in A$, $u \in S$ by the solving the integer programming optimization problem $$\text{Minimize} \sum_{e \in T} c_e \cdot x_e$$

subject to the following six constraints:

1. Flow conservation: all demand must be carried. For all u, $v \in S$, $$\sum_{e \in \delta^-(v)} (f_{ue}^+ - f_{ue}^-) - \sum_{e \in \delta^+(v)} (f_{ue}^+ - f_{ue}^-) = d_{uv}.$$

2. Circuit switches cannot serve as intermediate switches. For all $e \in T$ and $u \in S$, $$f_{ue}^+ = 0 \text{ if tail}(e) \in L \backslash \{u\} \text{ and } f_{ue}^- = 0 \text{ if head}(e) \in L \backslash \{u\}.$$

3. Capped trunk groups cannot grow:

$$x_e = 0 \text{ if } k_e = 1, e \in T.$$

4. If the trunk group does not grow ($g_e$=0), then we must have $x_e$=0. The following constraint forces $x_e$ to be zero whenever $g_e$ is zero.

$$1000 \cdot g_e \geq x_e.$$

5. Demand cannot exceed the capacity of a trunk group, taking into consideration loading limits and possible growth. For all $e \in T$, $$\sum_{u \in S} (f_{ue}^+ - f_{ue}^-) \leq 672 \cdot (l_g \cdot g_e + l_c \cdot (1 - g_e)) \cdot n_e + 672 \cdot l_g \cdot x_e,$$

where the number 672 converts DS3s into DS0s, the left-hand side of the foregoing equation being in units of DS0s.

6. Nonnegativity and integrality:

$$f_{ue}^+ \geq f_{ue}^- \geq 0 \forall u \in S, e \in A, x_e \in \{0,1,2,\ldots\} \forall e \in T, g_e \in \{0,1\} \forall e \in T.$$

C. Path Decomposition

Figure 2:
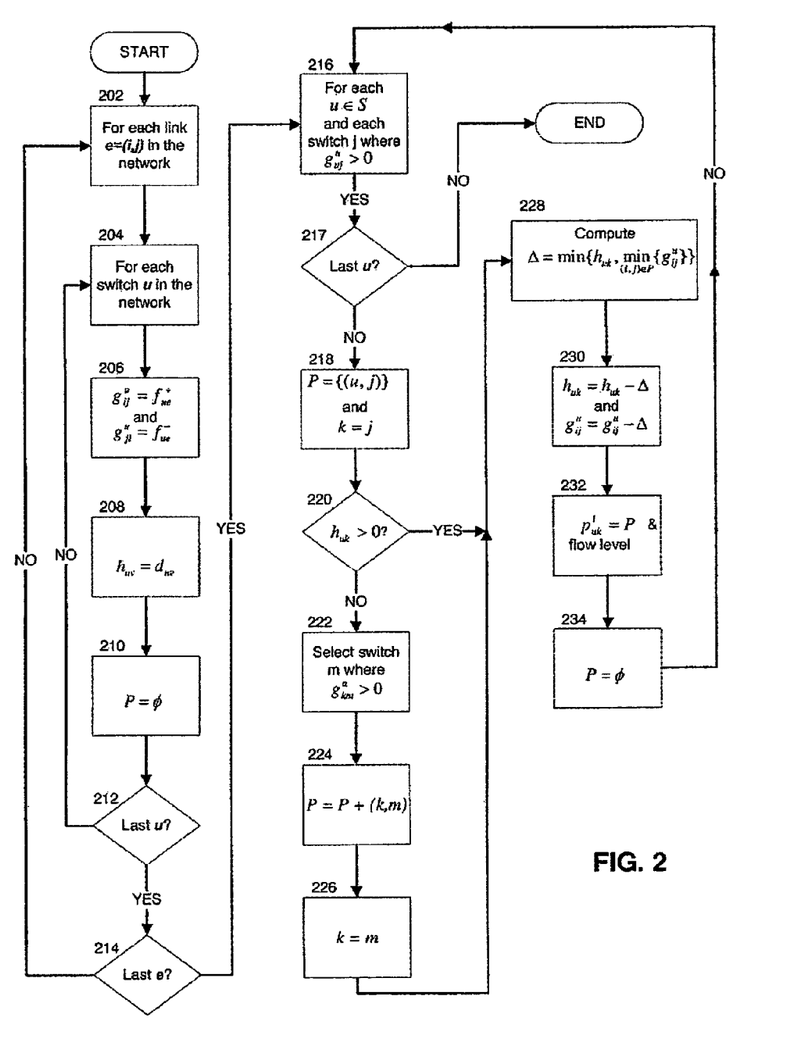
FIG. 2 illustrates a process flow used to find a set of path flows to which links may be added, according to an embodiment.

To implement the solution to the foregoing integer programming problem, i.e., the optimal set of link flows ($f_{ue}^+$, $f_{ue}^-$) for e∈A, u∈S, it is necessary to identify a set of path flows that will provide these link flows. It will be recognized that a set of path flows providing the optimal link flows is not unique. Therefore, the following heuristic, a flow decomposition algorithm, described with reference to the process 200 illustrated in FIG. 2, is used to find a set of path flows to which links may be added.

In step 202, a loop is established to process each link e(i,j), that is, for each link e from one switch, e.g., 102, to another switch, e.g., 104, in the set of all links A in the network, the process will perform one iteration for each link e.

Next, in step 204, a loop is established to process each switch u in the set S of all switches in the network such that the process will perform one iteration for each switch u.

Next, in step 206, the process sets $$g_{ij}^u = f_{ue}^+ \text{ and } g_{ji}^u = f_{ue}^-.$$

Next, in step 208, the process sets $h_{uv} = d_{uv}$, where v is the switch at the other end of the link e(i,j) from the switch u.

Next, in step 210, the process sets P to the empty set.

Next, in step 212, the process determines whether all switches u have been processed, or whether a further iteration of the loop established in step 204 is required. If all switches u have been processed, control proceeds to step 214. If further switches u remain to be processed, control returns to step 204.

In step 214, the process determines whether all links e have been processed, or whether a further iteration of the loop established in step 202 is required. If all links e have been processed, control proceeds to step 216. If further links e remain to be processed, control returns to step 202.

In step 216, a loop is established for each switch u∈S where there is a switch j such that $$g_{uj}^u > 0.$$

Next, in step 217, it is determined whether an iteration of the loop established in step 216 should be executed. If in the first iteration through step 217 switches u exist where there is a switch j such that $$g_{uj}^u > 0,$$

or if in subsequent iterations through step 217 no further switches u remain to be processed, the process ends. Otherwise, control proceeds to step 218.

In step 218, the link (u,j) is added to P and k is set to be equal to j.

Next, in step 220, the process determines whether $h_{uk} > 0$. If yes, control proceeds to step 228. Otherwise, control proceeds to step 222.

In step 222, the process selects a switch m such that $g_{km}^u > 0$.
Next, in step 224, the link (k,m) is added to the set P.
Next, in step 226, k is set to be equal to m.

Next, in step 228, the process computes $$\Delta = \min\left\{h_{uk}, \min_{(i,j) \in P} \{g_{ij}^u\}\right\}.$$

That is, Δ is set to the lesser of (a) the demand flowing from u to k and (b) the flow from the switch u having the least amount of available capacity.

Next, in step 230, the process sets $h_{uk} = h_{uk} - \Delta$, and also sets $$g_{ij}^u = g_{ij}^u - \Delta$$

for all (i,j)∈P. That is, the purpose of steps 228 and 230 is to find the paths needed to carry a given demand.

Next, in step 232, the process stores a record of path $$p_{uk}^i = P$$

with flow level Δ. It is to be understood that there may be multiple paths between u and k, and that these multiple paths are indexed by i.

Next, in step 234, P is reset to the empty set. Following step 234, control returns to step 216.

By the process 200, a set of paths with flows representing the optimal link flows in a network 100 may be identified. This set of paths is in accord with the goal of designing a minimal cost expansion plan. However, several complicating factors, including the fact that cost minimization by itself does not uniquely determine routing, make it preferred to implement a post-processing step, e.g., in a software module that rearranges path flows for operational efficiency.

Consider that the actual path routes identified in the process 200 are a consequence of path decomposition. As mentioned above, a different set of paths from the set selected in the process 200 may have the same expansion cost as the selected paths. For example, consider a minimal cost design in which two circuit switches are connected by two paths, a direct trunk group and a 2-hop path through a softswitch. Suppose that the 2-hop path is not fully utilized. Then it is possible to move traffic from the 1-hop path to the 2-hop path without changing the value of the objective function stated in the formulation of the integer programming problem above. Such a move seems intuitively unreasonable, as the 2-hop path is longer. Nonetheless, as an artifact of orderings in the path decomposition process 200, the process 200 could result in traffic being routed in just such a way. To prevent such "unreasonable" routing decisions, it is preferred to implement a post-processing step, e.g., in an additional software module that performs the function of allocating links, that does not alter the numbers of DS3s to be added to a trunk group, but shifts traffic to shorter routes wherever shorter routes have available capacity.

In some embodiments, once the process 200, and, if implemented, the post-processing step described above, is complete, a set of routes and the numbers of capacity units to add to each trunk group is returned to a user. The user can calculate the expansion cost by looking up the cost of each unit in a table. Alternatively, such a table could be stored in electronic format and the routing optimization tool could be deployed to automatically calculate expansion cost. Those skilled in the art will understand that the cost of adding a unit of capacity to a trunk group is a function of the switch type at either end of the trunk group (which determines port costs), and trunk group's length.

III. IMPLEMENTATION

In general, the routing optimization tool described herein, including the integer programming problem and the path decomposition process described above are generally carried out on a general purpose computer. In one embodiment, the tool is implemented using computer-executable instructions compiled from program instructions written in the C++ programming language. However, other programming languages known to those skilled in the art, including, but by no means limited to, JAVA™, could also be used. Further, in some embodiments, such program instructions may be integrated with, or linked to, a general purpose network management and planning tool. Those skilled in the art will recognize that such a tool may provide information regarding the network that is required for input to the routing optimization tool. Further, in one embodiment, the integer programming problem described above is solved using the CPLEX solver made by ILOG, Inc. of Mountain View, Calif., USA and ILOG SA of Gentilly Cedex, France. Those skilled in the art will understand that other modules or software components may be used to solve the integer programming problem in other embodiments.

A computer used to implement the processes described herein may be any one of a number of computing devices known to those skilled in the art, and may employ any of a number of computer operating systems known to those skilled in the art, including, but by no means limited to, known versions and/or varieties of the Microsoft Windows® operating system, the Unix operating system, and the Linux operating system. Further, those skilled in the art will recognize that the various processes described herein may be implemented as instructions executable by one or more computers. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

IV. EVALUATION AND ANALYSIS

A. Comparison to Other Routing Methods

As is known to those skilled in the art, traffic in a network such as a network 100 is generally routed according to a number of different methods. For example, those skilled in the art will recognize that routing is often determined according to local routing optimizers. Such optimizers might include "route all demand on the shortest path," "route all demand on the path with maximum spare capacity," and "route all demand on the path with the lowest metric," where the metric of a path is the sum of user defined "costs" on each hop. "Least hops, split paths" (LHSP), known in the art, routes all the demand from one switch to another on the path(s) with the smallest number of hops, dividing the demand equally among paths with the same number of hops. Thus, when a trunk group exists between two switches, LHSP will send all demand on this one-hop path. If the two switches are not directly connected with trunks, LHSP will find all two-hop paths and split demand equally over all of them.

Of all the locally optimal routing options discussed above, LHSP has the lowest expansion cost. For this reason, LHSP is compared below to the routing optimization tool disclosed herein. Intuitively, LHSP performs better than, say, an algorithm such as "route all demand on the shortest path" because it forces traffic to share trunk groups by using all available paths with the same number of hops. However, LHSP falls short of the processes described herein, which systematically find the sharing scheme that minimizes cost.

Figure 3:
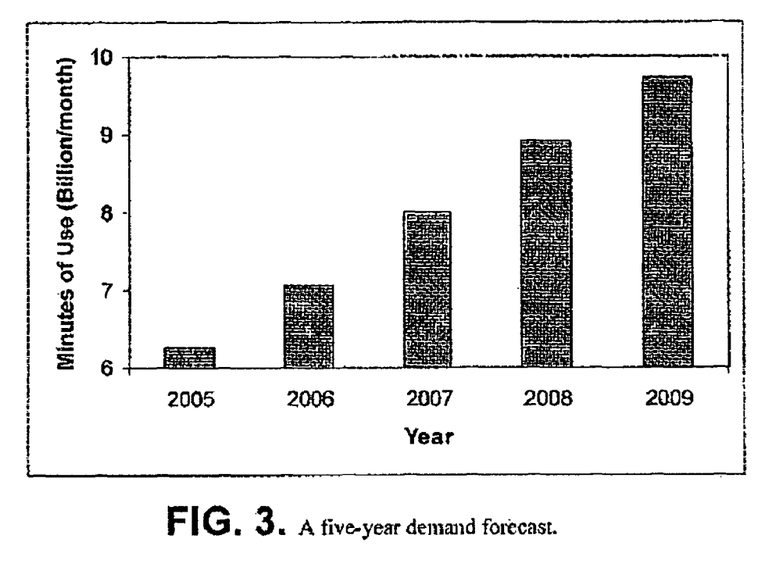
FIG. 3 shows an exemplary five year demand forecast.

To demonstrate the benefits of the tool described herein, it and LHSP have both been applied to a five-year demand forecast for 2005-2009, illustrated in FIG. 3. For a particular exemplary network, FIG. 3 shows how many billions of minutes of use enter the voice backbone during the busiest month of the years 2005-2009. In this case, the charted demand is the superposition of long distance traffic and wireless traffic from the entire United States, and turns out to grow almost linearly, although the two component types grow at different rates.

It should be noted that applying the routing optimization tool and LHSP year-by-year to a five-year forecast period provides an approximation in a few respects. For example, the analysis herein assumes that no switches are added to the network during the five years. In reality, new switches could be added every year, although where and when these switches would be added is unclear. In addition, port costs decrease over time, but are held constant in the present analysis, as it is not possible to guess when market forces will prompt discounts. However, the present exercise is grounded in reality in that, for maximum flexibility, it is desirable for a telecommunications provider to adjust its network annually to the next year's forecast and not, for example, every two years to a forecast two years out.

Further, a five-year forecast has been analyzed in order to offset a possible bias in favor of the routing optimization tool. That is, present networks have been designed without the tool, and therefore do not use optimal routing. Thus, in the first year when it is applied, the routing optimization tool could generate a deceptively large cost advantage over LHSP if it remedies inefficient routing choices made in earlier years. This potential windfall comes about because the network expansion dictated by the tool affects the routing of all network traffic, and not just incrementally added traffic. In years subsequent to the first year of application, the Optimizer can continue to reroute all traffic, but having already routed "old"

traffic optimally, it may lose its advantage over LHSP after the first year. The five-year comparison reveals the extent to which the Optimizer's cost advantage persists after the one-time gain in the first year.

To compare the capacity expansion costs of LHSP and the Optimizer, analysis using each was conducted based on the five-year forecast shown in FIG. 3, with the 2004 network used as a base point. The comparison uses busy hour demand matrices for each year. The routing optimization tool was applied using the 2005 demand matrix to find the lowest cost way to grow the 2004 network to carry the 2005 demand. Then the tool was applied to grow the resulting 2005 network to carry the forecasted 2006 demand matrix at least cost, and so on through 2009. In addition, a similar analysis was performed for each year using LHSP instead of optimal routing.

Figure 4:
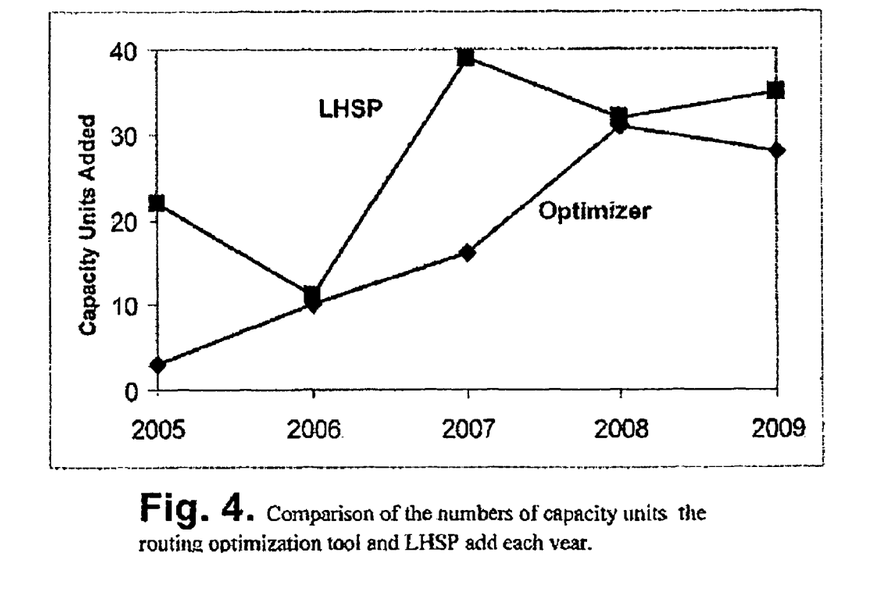
FIG. 4 shows an exemplary comparison of the numbers of capacity units added on a yearly basis according to each of the routing optimization tool disclosed herein and the least hops, split paths heuristic.

The LHSP-Optimizer comparison may be analyzed according to both the numbers of capacity units added and the capital expenditures on capacity. FIG. 4 shows the numbers of capacity units added. It can be seen that the number of units added by the routing optimization tool increases from year to year, except in 2009, which shows a decline of 3 units from 2008. The steadily increasing increments parallel the growth in forecasted demand, which makes steadily increasing annual budget requests credible. In contrast, the number of units that LHSP adds jumps up and down from year to year and bears little resemblance to the pattern of the overall forecast. Moreover, the routing optimization tool adds a total of 88 units over the five-year planning period, while LHSP adds 51 more, or 139 units. Thus, the tool requires 37% fewer units than does LHSP.

Consequently, LHSP requires much higher capital expenditures. Assume that future dollars are converted into their present value (i.e., their 2005 value for the purposes of the present example) by discounting them with an 11% cost of capital. Over the five-year period represented in FIG. 3, the present value of the capital expenditures dictated by the routing optimization tool are 60% of the capital expenditures that would be dictated by LHSP. Thus, capacity expansion with the routing optimization tool is both less expensive than planning expansion with other tools, as well as more efficient from year to year.

B. Costs of Using the Routing Optimization Tool

The size of the savings to be achieved with the routing optimization tool, discussed above, might raise concerns that such saving cannot be achieved without hidden costs. That is, in the example represented in FIG. 4, the routing optimization tool would install only three capacity units in the first year of an expansion plan as opposed to twenty-two that would be installed by LHSP. This section shows that, in subsequent years, there are no significant hidden costs that dilute the tool's reductions in capital expenditures.

1. Complex Routing

One concern is that, in its effort to squeeze demand into as little capacity as possible, the routing optimization tool might often split the demand from one switch to another over many paths. Those skilled in the art know that complex routes present an operational burden, making it difficult to program routing tables into switches, monitor networks, etc. Further, as is known, unnecessarily long paths may have unacceptably large propagation delays.

Table 1 below shows the degree of demand splitting, i.e., the distribution of demands according to the number of paths used, that occurred after use of LHSP in one real-world situation. A demand is all traffic of a given type (Long Distance or Wireless) between two switches. Each entry of the table shows the percentages of demands that split into a given number of paths in the year 2005.

TABLE 1

| Number of paths | LHSP | Optimization Tool |
|---|---|---|
| 1 | 74.97% | 94.50% |
| 2 | 5.24% | 4.59% |
| 3 | 16.78% | 0.92% |
| 4 | 1.97% | — |
| 5 | 0.26% | — |
| 6 | 0.66% | — |
| 7 | 0.13% | — |

Table 1 shows that the routing optimization tool will not cause excessive demand splitting. In fact, the tool never splits a demand over more than three paths, and uses more than one path for only about 5% of demands. In contrast, LHSP is explicitly configured always to split up demands as finely as the necessary number of hops dictates. If a direct trunk group is available for a demand, no splitting occurs. However, when n-hop paths exist but no n-1-hop paths exist, LHSP uses all n-hop paths. The last row of Table 1 indicates at least one demand split into 7 paths with the same number of hops.

A related view of the tradeoff between expansion cost and routing complexity appears in Table 2 below. Table 2 shows the distribution of maximal hop paths, that is, the percentage of demands whose longest path (in hops) has a given number of hops.

TABLE 2

| Max. no. hops | LHSP | Optimizer |
|---|---|---|
| 1 | 70% | 50% |
| 2 | 29% | 45% |
| 3 | 1% | 5% |

As just discussed, under LHSP, all paths that a given demand follows have the same number of hops. Since LHSP uses a 1-hop path whenever one exists, 70% of demands use a direct connection. However, the Optimizer may split a given demand over paths with different numbers of hops to minimize the capacity expansion cost. As a result, a larger fraction of demands use more than one hop for at least part of their traffic, but this fraction is not onerously large, and is a more-than-acceptable trade off for reduced expansion costs.

2. Path Churn

The preceding section shows that the routing optimization tool does not create unduly complex routing in a single year. However, the tool may require routing changes from year to year. This task of adding or deleting paths to routing tables may be referred to as "path churn." Continuing the example initiated above with reference to FIG. 3, FIG. 5 displays path churn data for the routing optimization tool. Note that LHSP has no path churn at all; its routing is fixed because we add no nodes and, therefore, no links to the network.

Figure 5:
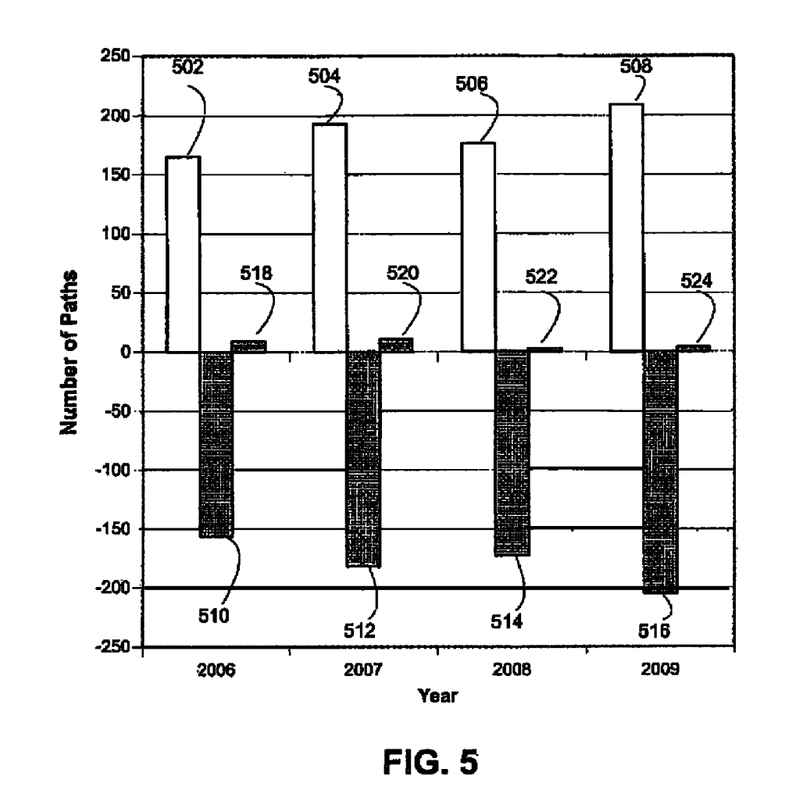
FIG. 5 shows exemplary path churn data for the routing optimization tool disclosed herein.

FIG. 5 shows the total number of paths added, the total number of paths deleted, and the net paths added in each year. Bars 502, 504, 506, and 508, falling roughly between 150 and 200 on the y-axis of the graph in FIG. 5, show the number of paths added, while bars 510, 512, 514, and 516, falling roughly between −200 and −150 on the y-axis, represent paths deleted. The net, i.e., additions minus deletions, is positive but small in each year. In this example, the actual values are 9, 11, 3, and 4, reflected by bars 518, 520, 522, and 524, in the four years from 2006-2009, respectively. For the network 100 in the example provided herein, the total number of paths in use hovers in the neighborhood of 500. Moreover, up to about 200 paths per year are retired, meaning that the path churn is as high as 20% per year.

Path churn requires personnel to update routing tables annually, and therefore does entail operational expenses. However, operations staff generally can carry out such updates from a central computer and each change takes little time. Thus, in general, the impact of the path churn discussed above is negligible.

3. Shifting Traffic onto an IP Network

The scope of the routing optimization tool disclosed herein is limited to trunk groups and the switches 102 and 104 that terminate them. The tool treats the IP network 106 that interconnects the softswitches 104 as a "cloud," about which it blows only that softswitches 104 are entry and exit points. Accordingly, as explained above, the tool views all paths between two softswitches 104 (i.e., paths through network 106) as the same single link 103, that is, as having the same cost, and thus views hops within the network 106 as having no cost, and does not know (or need to know) about remaining capacity within the network 106 cloud. To the routing optimization tool, adding capacity to a 2-hop path, e.g., circuit switch 102/softswitch 104/circuit switch 102, costs the same as adding capacity to a 3-hop path, e.g., circuit switch 102/softswitch 104/softswitch 104/circuit switch 102. Augmenting the two paths circuit switch 102/softswitch 104 and circuit switch 102/softswitch 104/softswitch 104 also cost the same in the tool's view. Moreover, growth occurs only when the trunk groups connected to the circuit switches 102 become full. In reality, of course, IP network 106 resources used by the longer paths described above are not free; IP network 106 expansion simply has different triggers.

Thus, treating IP network 106 hops as "free" raises the concern that the routing optimization tool lowers the cost of the trunk network 100 at the expense of raising the cost of an associated IP network 106. The tool does account for ports on the "edge" of the IP cloud. Consequently, the tool can increase the IP network 106 cost without accounting for it only by using hops inside the IP network 106.

Figure 6:
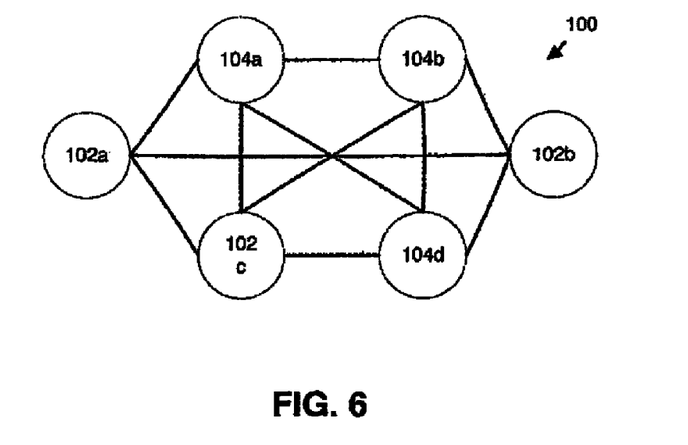
FIG. 6 illustrates examples of different paths that could accommodate traffic in a network.

FIG. 6 illustrates different paths that could accommodate traffic in network 100. For example, suppose that circuit switch 102a has trunk groups to softswitches 104a and 104c, while circuit switch 102b has trunk groups to softswitches 104b and 104d. Assume also that a trunk group exists between circuit switches 102a and 102b. In such a case, traffic can flow between switches 102a and 102b on the 1-hop path 102a-102b or the 3-hop paths 102a-104a-104b-102b, 102a-104a-104d-102b, 102a-104c-104b-102b, and 102a-104c-104d-102b.

Assume that the new 102a-102b demand requires either new capacity between 102a and 102b or new capacity between softswitches 104, but not new capacity on any of the four trunk groups between the circuit switches 102 and the softswitches 104; these trunk groups have unused capacity that could carry the new demand.

Continuing the foregoing example, the routing optimization tool routes the new demand over the 3-hop paths to avoid adding capacity between 102a and 102b. But if this choice forces the addition of IP resources to IP network 106, say, to all four softswitches 104 shown in FIG. 6, then adding capacity between 102a and 102b could actually be the cheaper alternative. In such a case, the routing optimization tool would have shifted traffic onto the IP network 106 when such a shift of traffic is not optimal.

However, it is not believed that such potential shifting is disadvantageous. For one thing, the situation is unlikely to arise, because IP networks 106 generally enjoy excess capacity. Further, even if such traffic shifting does occur, it is generally preferable to allocate resources to the IP network 106, instead of the trunk network 100, inasmuch as most telecommunications vendors are seeking to migrate from a circuit-switched environment to a packet-switched environment.

V. CONCLUSION

With regard to the processes, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of network monitoring, and that the disclosed systems and methods will be incorporated into such future embodiments. Further, although embodiments described herein refer to VoIP networks, it should be understood that embodiments applied to other kinds of networks will be within the scope and spirit of the presently claimed invention. Accordingly, it should be understood that the invention is capable of modification and variation and is limited only by the following claims.

We claim:

1. A method, comprising:
assigning at least one first cost for expanding at least one link to a circuit-switched network that is part of a hybrid network comprising the circuit switched network and a packet switched network;
representing all paths in the packet switched network as a virtual link in the hybrid network;
assigning a second cost to the virtual link, wherein the virtual link connects at least two circuit-switched network devices and wherein the second cost represents that hops within the packet switched network between the at least two circuit-switched network devices have no associated cost;
solving an integer programming problem in a computer having a processor and a non-transitory memory to determine a number of links to add to the hybrid network, the integer programming problem having as inputs a model of the hybrid network and a demand forecast matrix, wherein solving the integer programming problem includes determining whether a trunk group is permitted to grow, and wherein solving the integer programming problem includes considering the following variables: a set of trunk groups, a trunk group in the set, a cost of adding a circuit to the trunk group, and a number of circuits added to the trunk group.

2. The method of claim 1, further comprising using a path decomposition heuristic to find a set of paths to which at least one link may be expanded.

3. The method of claim 1, further comprising determining whether to migrate network traffic from the circuit-switched network to the packet switched network based on a result of solving the integer programming problem.

4. The method of claim 1, further comprising expanding links to the circuit-switched network according to a solution to the integer programming problem.

5. The method of claim 4, further comprising routing network traffic such that availability capacity on shorter routes is consumed before available capacity on longer routes.

6. The method of claim 1, wherein the model of the hybrid network includes a set A of all links in the network and a set S of all switches in the network.

7. The method of claim 1, wherein the integer programming problem takes the form: Minimize $$\sum_{e \in T} c_e \cdot x_e$$

subject to a set of predetermined constraints, where T is the set of trunk groups, e is the trunk group in the set T, $c_e$ is the cost of adding a circuit to the trunk group e, and $x_e$ is the number of circuits added to the trunk group e.

8. The method of claim 1, wherein the second cost assigned to the virtual link is the same as the first cost for expanding at least one link to the circuit-switched network.

9. A system, comprising:
a model of a hybrid network that comprises a circuit-switched network including a plurality of links and a packet switched network that is represented as a virtual link in the hybrid network, each of the links and the virtual link being associated with a cost;
wherein the virtual link connects at least two circuit-switched network devices and wherein the cost associated with the virtual link represents that hops within the packet switched network and between the at least two circuit-switched network devices have no associated cost;
a demand matrix for the hybrid network; and
an integer programming module stored in a non-transitory computer memory as a set of computer-executable instructions, the module configured to provide a solution to an integer programming problem to determine an amount of capacity to add to the hybrid network, the integer programming problem having as input at least the model of the hybrid network and the demand matrix, wherein the solution to the integer programming problem considers whether a trunk group is permitted to grow and the following variables: a set of trunk groups, a trunk group in the set, a cost of adding a circuit to the trunk group, and a number of circuits added to the trunk group.

10. The system of claim 9, further comprising a path decomposition module configured to find a set of paths in the circuit-switched network to which at least one link may be added.

11. The system of claim 9, the integer programming module further configured to provide a solution to the integer programming problem that may be used to determine whether to migrate network traffic from the circuit-switched network to the packet switched network based on the solution.

12. The system of claim 9, further comprising a link allocation module for adding links to the circuit-switched network according to the solution.

13. The system of claim 12, wherein the link allocation module is configured to route network traffic such that availability capacity on shorter routes is consumed before available capacity on longer routes.

14. The system of claim 9 wherein the model of the hybrid network further comprises a set A of all links in the network and a set S of all switches in the network.

15. The system of claim 9, further comprising a cost determination module for determining the cost.

16. The system of claim 9, wherein the integer programming problem takes the form: Minimize $$\sum_{e \in T} c_e \cdot x_e$$

subject to a set of predetermined constraints, where T is the set of trunk groups, e is the trunk group in the set T, $c_e$ is the cost of adding a circuit to the trunk group e, and $x_e$ is the number of circuits added to the trunk group e.

17. The system of claim 9, further comprising a first cost associated with the circuit switched network and a second cost associated with the packet switched network.

18. A non-transitory computer-readable medium tangibly embodying computer-executable instructions, the instructions comprising:
assigning at least one first cost for expanding at least one link to a circuit-switched network that is part of a hybrid network comprising the circuit switched network and a packet switched network;
representing all paths in the packet switched network as a virtual link in the hybrid network;
assigning a second cost to the virtual link, wherein the virtual link connects at least two circuit-switched network devices and wherein the second cost represents that hops within the packet switched network between the at least two circuit-switched network devices have no associated cost;
solving an integer programming problem in a computer having a processor and a non-transitory memory to determine a number of links to add to the hybrid network, the integer programming problem having as inputs a model of the hybrid network and a demand forecast matrix, wherein solving the integer programming problem includes determining whether a trunk group is permitted to grow, and wherein solving the integer programming problem includes considering the following variables: a set of trunk groups, a trunk group in the set, a cost of adding a circuit to the trunk group, and a number of circuits added to the trunk group.

19. The medium of claim 18, further comprising instructions for using a path decomposition heuristic to find a set of paths in the circuit-switched network to which at least one link may be added.

20. The medium of claim 18, further comprising instructions for determining whether to migrate network traffic from the circuit-switched network to the packet switched network based on a solution to the integer programming problem.

21. The medium of claim 18, further comprising instructions for adding links to the circuit-switched network according to a solution to the integer programming problem.

22. The medium of claim 21, further comprising instructions for routing network traffic such that availability capacity on shorter routes is consumed before available capacity on longer routes.

23. The medium of claim 18, wherein the model of the hybrid network includes a set A of all links in the network and a set S of all switches in the network.

24. The medium of claim 18, wherein the integer programming problem takes the form: Minimize $$\sum_{e \in T} c_e \cdot x_e$$

subject to a set of predetermined constraints, where T is the set of trunk groups, e is the trunk group in the set T, $c_e$ is the cost of adding a circuit to the trunk group e, and $x_e$ is the number of circuits added to the trunk group e.

25. The instructions of claim 18, wherein the second cost assigned to the virtual link is the same as the first cost for expanding at least one link to the circuit-switched network.

26. A method, comprising:
   assigning a cost to adding at least one link to a network, the cost representing that hops within a packet switched network between at least two circuit-switched network devices have no associated cost and that all paths between softswitches that connect a circuit-switched network to the packet switching network have the same associated cost;
   solving an integer programming problem in a computer having a processor and a non-transitory memory to determine a number of links to add to the network, the integer programming problem having as inputs a model of the network and a demand forecast matrix, wherein solving the integer programming problem includes determining whether a trunk group is permitted to grow, and wherein solving the integer programming problem includes considering the following variables: a set of trunk groups, a trunk group in the set, a cost of adding a circuit to the trunk group, and a number of circuits added to the trunk group;
   using a path decomposition heuristic to find a set of paths to which at least one link may be added.

27. The method of claim 1, wherein the circuit switched network and the packet switched network are connected by a plurality of softswitches, and wherein the second cost to the virtual link further represents that all paths between any two of the plurality of softswitches have the same associated cost.

\* \* \* \* \*